US008898282B2

(12) United States Patent
Fox et al.

(10) Patent No.: US 8,898,282 B2
(45) Date of Patent: Nov. 25, 2014

(54) AUTO GENERATED AND INFERRED GROUP CHAT PRESENCE

(75) Inventors: Andrew Fox, Sudbury, MA (US); David Marshall LaPalomento, Lexington, MA (US); Ian Edward Roughley, Cambridge, MA (US); Scott A. Isaacson, Woodland Hills, UT (US)

(73) Assignee: Novell, Inc., Provo, UT (US)

( * ) Notice: Subject to any disclaimer, the term of this patent is extended or adjusted under 35 U.S.C. 154(b) by 76 days.

(21) Appl. No.: 12/690,028

(22) Filed: Jan. 19, 2010

(65) Prior Publication Data

US 2011/0010447 A1    Jan. 13, 2011

Related U.S. Application Data

(60) Provisional application No. 61/224,778, filed on Jul. 10, 2009, provisional application No. 61/236,005, filed on Aug. 21, 2009.

(51) Int. Cl.
  *G06F 15/173* (2006.01)
  *G06Q 10/10* (2012.01)

(52) U.S. Cl.
  CPC .................................. *G06Q 10/10* (2013.01)
  USPC ........... 709/224; 709/206; 709/229; 715/753; 715/751

(58) Field of Classification Search
  USPC ................................................. 709/203–206
  See application file for complete search history.

(56) References Cited

U.S. PATENT DOCUMENTS

| | | | |
|---|---|---|---|
| 6,778,642 B1 | 8/2004 | Schmidt et al. | |
| 7,299,193 B2* | 11/2007 | Cragun et al. | 705/7.13 |
| 7,349,528 B2 | 3/2008 | Schmidt et al. | |
| 7,533,153 B1* | 5/2009 | Wood et al. | 709/206 |
| 7,693,736 B1* | 4/2010 | Chu et al. | 705/7.19 |
| 7,702,315 B2 | 4/2010 | Engstrom et al. | |
| 7,831,664 B2* | 11/2010 | Malik | 709/204 |
| 7,831,928 B1 | 11/2010 | Rose et al. | |
| 8,140,621 B2 | 3/2012 | Vance et al. | |
| 2003/0112273 A1 | 6/2003 | Hadfield | |
| 2004/0085354 A1 | 5/2004 | Massand | |
| 2005/0039116 A1 | 2/2005 | Slack-Smith | |
| 2006/0173784 A1 | 8/2006 | Marples et al. | |
| 2007/0071187 A1 | 3/2007 | Apreutesel et al. | |
| 2007/0113201 A1 | 5/2007 | Bales et al. | |
| 2007/0143415 A1* | 6/2007 | Daigle | 709/206 |
| 2007/0226125 A1 | 9/2007 | Temte et al. | |
| 2007/0226357 A1* | 9/2007 | McMurry et al. | 709/229 |
| 2007/0260683 A1 | 11/2007 | Hintermeister et al. | |
| 2007/0282887 A1 | 12/2007 | Fischer et al. | |
| 2007/0288573 A1* | 12/2007 | Malik | 709/205 |
| 2008/0091778 A1 | 4/2008 | Ivashin et al. | |
| 2008/0114776 A1* | 5/2008 | Sun et al. | 707/10 |

(Continued)

OTHER PUBLICATIONS

Google Wave, "About Google Wave"; DVD, May 28, 2009.

(Continued)

*Primary Examiner* — Greg C Bengzon
(74) *Attorney, Agent, or Firm* — Marger Johnson & McCollom PC (57) ABSTRACT

A system can include multiple individual status identifiers that correspond to multiple users and a group status identifier that corresponds to a group with which the users are associated. A status identifier update module can update the group status identifier based on a change to at least one of the individual status identifiers.

14 Claims, 6 Drawing Sheets

(56) References Cited

U.S. PATENT DOCUMENTS

| | | |
|---|---|---|
| 2008/0125157 A1* | 5/2008 | Zhang ............................ 455/518 |
| 2008/0133698 A1 | 6/2008 | Chavez et al. |
| 2008/0153459 A1 | 6/2008 | Kansal et al. |
| 2009/0049135 A1* | 2/2009 | O'Sullivan et al. ........... 709/206 |
| 2009/0061825 A1 | 3/2009 | Neelakantan et al. |
| 2009/0092124 A1 | 4/2009 | Singhai et al. |
| 2009/0100128 A1 | 4/2009 | Czechowski et al. |
| 2009/0113311 A1* | 4/2009 | Fried ............................. 715/753 |
| 2009/0125413 A1 | 5/2009 | Le Chevalier et al. |
| 2009/0182815 A1 | 7/2009 | Czechowski et al. |
| 2010/0023615 A1 | 1/2010 | Grigsby et al. |
| 2010/0257457 A1 | 10/2010 | De Goes |
| 2011/0153452 A1 | 6/2011 | Flinn et al. |
| 2011/0293079 A1 | 12/2011 | Khouri et al. |

OTHER PUBLICATIONS

Google Wave, "About Google Wave"; http://wave.google.com/help/wave/about.html#video, retrieved Jan. 27, 2 2010 (one page).

Google Wave, "About Google Wave"; http:/wave.google.com, retrieved Jan. 3 27, 2010 (33 pages).

FriendFeed, "FriendFeed is the easiest way to share online"; http://friendfeed.com, retrieved Jan. 27, 2010 (30 pages).

Digg Labs, "What's this?"; http://labs.digg.com, retireved Jan. 27, 2010 (one 5 page).

Digg Labs, "Swarm"; http://labs.digg.com/swarm, retrieved Jan. 27, 2010 (three pages).

* cited by examiner

AUTO GENERATED AND INFERRED GROUP CHAT PRESENCE

CROSS-REFERENCE TO RELATED APPLICATIONS

This application claims the benefit of U.S. Provisional Patent Application Ser. No. 61/224,778, titled "COLLABORATION TOOLS" and filed on Jul. 10, 2009, and U.S. Provisional Patent Application Ser. No. 61/236,005, titled "PRESENCE-ENABLED INBOX" and filed on Aug. 21, 2009, both of which are hereby fully incorporated by reference herein.

This application is related to U.S. patent application Ser. No. 12/690,066, titled "COLLABORATION SWARMING" and filed on Jan. 19, 2010, U.S. patent application Ser. No. 12/690,071, titled "INTELLIGENT CO-BROWSING AND CO-EDITING" and filed on Jan. 19, 2010, U.S. patent application Ser. No. 12/690,038, titled "UNIFIED ADDRESSING, SENDING, AND RECEIVING COLLABORATION SERVICE" and filed on Jan. 19, 2010, U.S. patent application Ser. No. 12/690,056, titled "UNIFIED EDITABLE INBOX" and filed on Jan. 19, 2010, and U.S. patent application Ser. No. 12/690,075, titled "PRESENCE-ENABLED INBOX" and filed on Jan. 19, 2010, all of which are commonly assigned with this application and are hereby fully incorporated by reference herein.

TECHNICAL FIELD

The disclosed technology pertains to multi-user environments, and more particularly to updating group and/or user statuses responsive to changes in one or more user statuses.

BACKGROUND

Current collaborative systems allow for an individual user to set his or her presence or status such that other users can see if he or she is available. For example, chat clients can indicate whether the user is available to chat or whether he or she is currently busy with other tasks. The user's personal status can indicate to others whether there is a special way to communicate with him or her outside of the chat tool. Chat clients can also allow for a person to set up his or her own list of contacts and groups within the system.

However, such systems are limited. For example, the individual status or present value for a user of these current tools is singular. That is, the user's status cannot be set differently for any of the individuals or groups in the user's contact list, let alone any other users or groups within the system. For example, if a certain user sets his or her status to "busy," then his or her personal status is set to "busy" for all of that user's contacts and groups with which he maintains a connection, regardless of the significance of any of those groups or individual contacts to the user.

SUMMARY

An individual user can have more than one status or presence values. If the user participates in a collaborative multi-user environment, for example, the user may wish to have a number of different personal status values depending on the number of associations the user has with other users or groups in the environment. Embodiments of the disclosed technology can enable the user to set different presence values for different users or different groups with whom he or she interacts or communicates.

Embodiments of the disclosed technology can include setting a group status for a particular group based on the individual statuses of the members of the group, for example. In certain embodiments, a group status can be set based on inference rules, e.g., via a policy, using the individual status of some or all of the members of the group. For example, the group status can be set to the most recent change to any individual status of the group members. A user can thus see what is going on at the group level and not just on an individual basis.

In certain embodiments, an individual user can control the visibility of his or her status to other users or groups. For example, the user can direct that his or her personal status be hidden from certain users or groups but exposed to other users or groups. Certain implementations can include automatically setting the visibility of a user's personal status based on a policy that controls the user's status visibility, for example.

The foregoing and other features, objects, and advantages of the invention will become more readily apparent from the following detailed description, which proceeds with reference to the accompanying drawings.

DETAILED DESCRIPTION

Embodiments of the disclosed technology can include methods and systems that advantageously enable a user to simultaneously maintain a different presence, e.g., an individual or personal status, for each entity or group to which he or she belongs or with which he or she interacts. For example, a user can have his or her chat or collaborative interaction status set differently depending on which individual users or groups with which he or she is presently communicating or interacting. In other words, an individual can have more than one presence or individual status value, and these different status values can be set in different contexts.

Consider an example in which a user named Ruth is a member of two different groups, one of which is called "work project" and the other of which is called "noon basketball." If Ruth were to set her status to "coding" using prior systems, such systems would set her status to "coding" for all of the different groups to which she belongs or with which she interacts, e.g., "work project" and "noon basketball" in the example. This is undesirable because the term "coding" may not mean anything to the other members of the "noon basketball" group. In contrast, implementations of the disclosed technology can advantageously set two different personal statuses for Ruth: whereas Ruth's personal status as presented to the group called "work project" can be set to "coding," Ruth's personal status as presented to the group called "noon basketball" can be set to "busy."

In certain embodiments, the system can determine or update a group status for the group based on an update to the personal status of at least one member of the group. Consider an example in which a user Ruth is one of ten members of a "noon basketball" group. If a certain number of the group members, e.g., a majority of the group, all have personal statuses that are currently set to "busy," the system can determine that the group status for the "noon basketball" group should be set to "forfeit." If a certain number of the group members, e.g., a majority of the group, all have personal statuses that are currently set to "practice," however, the system can determine that the group status for the "noon basketball" group should be set to "practice."

In certain embodiments, a group presence or status value can be set from policy-controlled rules that enable the system to determine the group status based on the presence values for some or all of the members of the group. For example, a group status can be set to the most recent individual status or last status change of any of the group members. Alternatively, the system can set the group status based on certain events indicated by an individual status. For example, if a group member updates his or her personal status to "just finished the test version," the system can set the group status to "Test Version Complete."

If a certain number, e.g., a majority, of the members of the group have a similar or identical status such as "out of the office," for example, the status for the group can be set to the majority individual status or an equivalent such as "the group is out of the office," or "a majority of the group is out of the office." If there is not a majority individual user status, the system can set the group status to the individual status having the most representation among the users.

Thus, a group can have a group status that is different than the collective status of the individual statuses of all the individual users associated with the group. One having ordinary skill in the art will appreciate that there are a virtually unlimited number of variations in determining a group status based on the individual statuses of group members and that the determination of a particular group's status should not be limited to only the examples presented herein.

Figure 1:
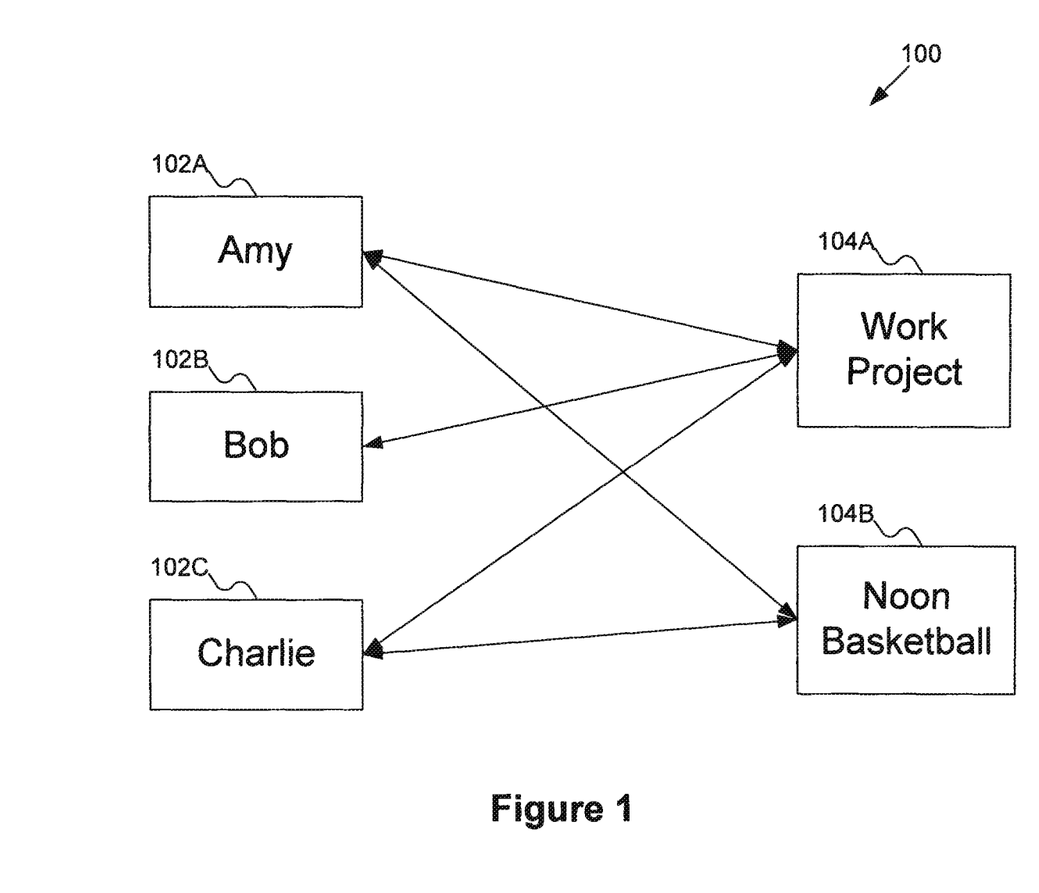
FIG. 1 is a block diagram that illustrates an example of a multi-user environment in accordance with embodiments of the disclosed technology.

FIG. 1 is a block diagram that illustrates an example of a multi-user environment 100 that includes three users: Amy 102A, Bob 102B, and Charlie 102C. The multi-user environment 100 also includes two groups: "Work Project" 104A and "Noon Basketball" 104B. In the example, user Amy 102A is associated with both groups 104A and 104B. In other words, Amy 102A belongs to, subscribes to, or otherwise participates in either or both of the groups 104A and 104B. User Charlie 102C, like Amy 102A, is associated with both the Work Project group 104A and the Noon Basketball group 104B.

Amy 102A and Charlie 102C may belong to the Work Project group 104A because they are required to be members or because they are simply interested in the group. For example, the group may provide occasional updates on a particular technology that could impact the work that either Amy 102A or Charlie 102C are doing. Amy 102A and Charlie 102C may belong to the Noon Basketball group 104B because they enjoy playing basketball with the other group members over their lunch break or, if they do not enjoy playing, they may simply wish to keep track of what the other members of the group are up to.

In the example, user Bob 102B is associated with only group: Work Project 104A. Bob 102B may not be associated with the Noon Basketball group 104B for any of a number of reasons. For example, Bob 102B may not like basketball and thus not want to participate with the other members of the group. Alternatively, Bob 102B may not be presently aware of the group but, upon learning of the group 104B, Bob 102B may decide to join.

Figure 2:
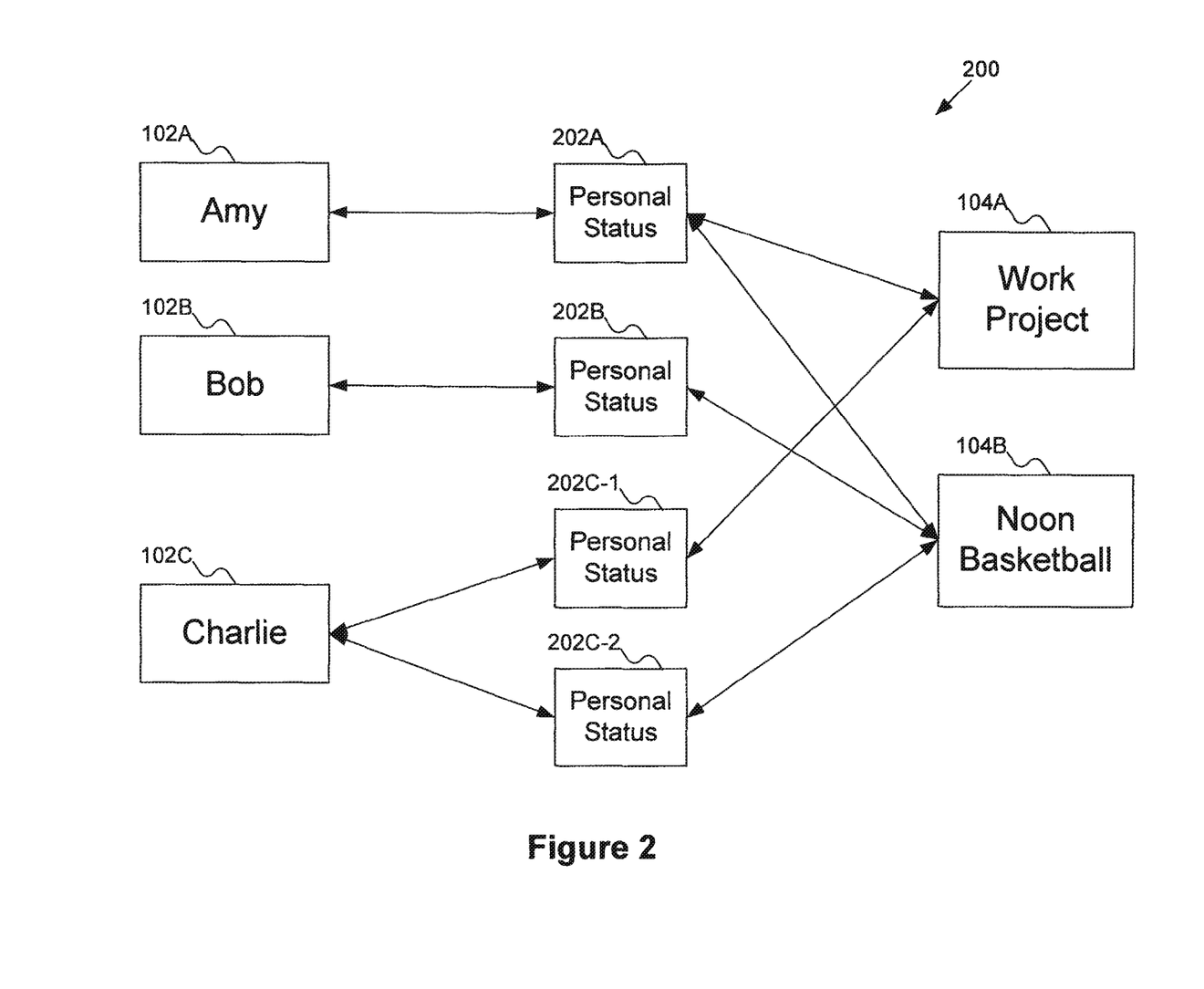
FIG. 2 is a block diagram that illustrates an example of a multi-user environment in which each user has one or more personal statuses in accordance with embodiments of the disclosed technology.

FIG. 2 is a block diagram that illustrates an example of a multi-user environment 200 in which each user can have one or more personal or individual statuses to be provided to different users or groups via a status identifier. In the example, user Amy 102A has a single personal status identifier 202A that is provided to both of the groups with which she is associated, i.e., the Work Project group 104A and the Noon Basketball group 104B. User Bob 102B also has a single personal status identifier 202B that is provided to the Work Project group 104A, the only group with which Bob 102B currently maintains an association or interest.

User Charlie 102C, however, has two different personal status identifiers: a first personal status identifier 202C-1 that is provided to the Work Project group 104A, and a second personal status identifier 202C-2 that is provided to the Noon Basketball group 104B. For example, Charlie 102C may update his personal status to "on vacation." The system can receive this personal status update and automatically determine, e.g., by applying a policy, that Charlie's first personal status identifier 202C-1 should be set to "out of the office" or simply "out," and that Charlie's second personal status identifier 202C-2 should be set to "unavailable to play."

Figure 3:
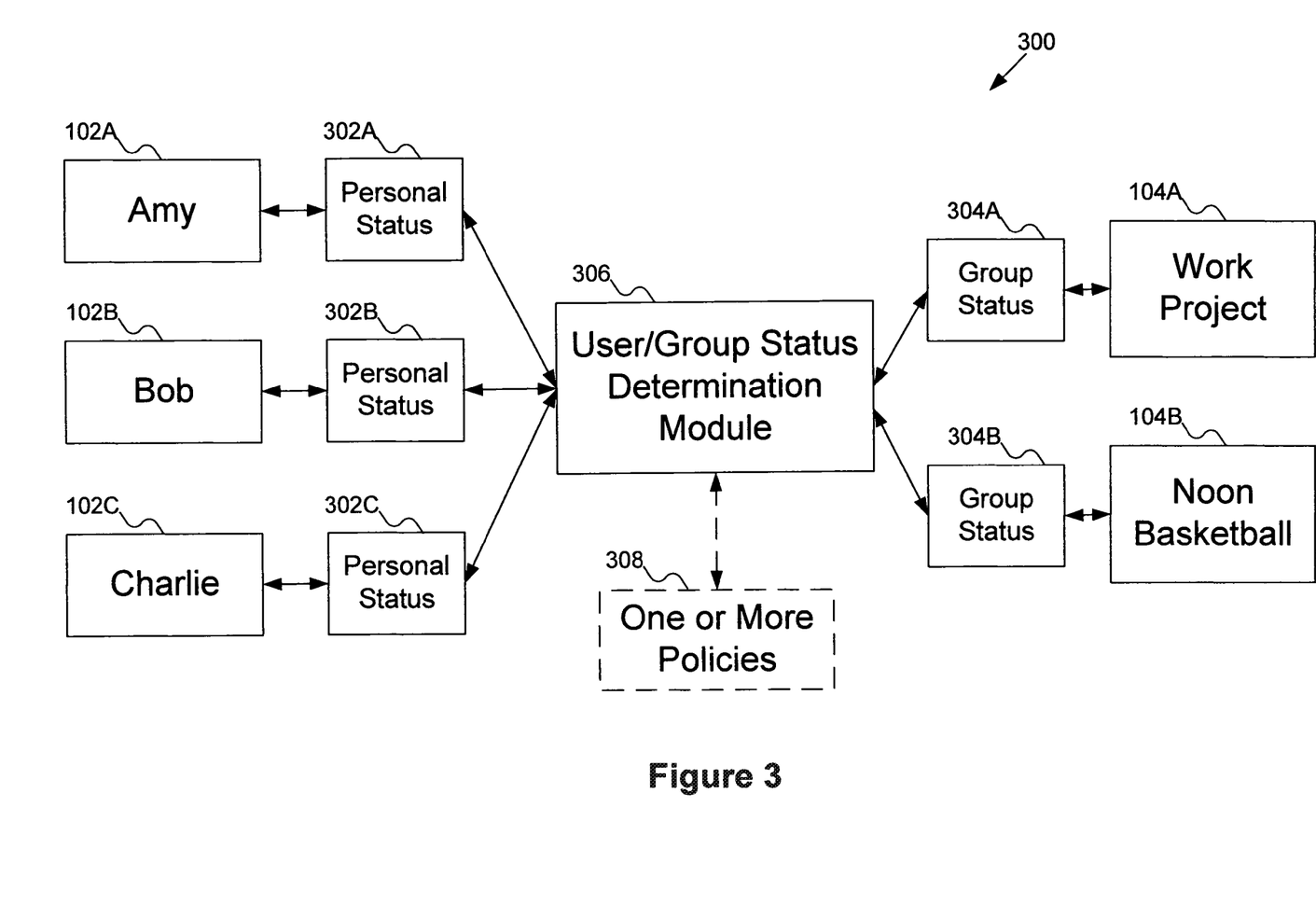
FIG. 3 is a block diagram that illustrates an example of a multi-user environment in which one or more group statuses can be updated based on the personal statuses of the users in accordance with embodiments of the disclosed technology.

FIG. 3 is a block diagram that illustrates an example of a multi-user environment 300 in which one or more group statuses can be updated based on the personal statuses of the individual users. In the example, users Amy 102A, Bob 102B, and Charlie 102C need only update their local personal statuses 302A, 302B, and 302C, respectively. Upon receiving notice of the update(s), a user/group status determination module 306 can then determine what external personal statuses, e.g., via the personal status identifiers 202A, 202B, and 202C of FIG. 2, should be provided to other users or groups within the multi-user environment 300.

It should be noted that the local personal statuses 302A, 302B, and 302C of FIG. 3 are distinct from the external personal status identifiers 202A, 202B, and 202C, respectively, of FIG. 2. While local and external personal status identifiers will often contain the same value, there are situations in which a user may desire that different external statuses be provided to different users or groups. As discussed above, for example, Charlie 102C may desire that two different external statuses 202C-1 and 202C-2 be provided to the Working Project group 104A and the Noon Basketball group 104B, respectively, by updating his personal status to "on vacation."

The personal status referred to in this example is Charlie's local personal status identifier 302C. Thus, by setting his local personal status identifier 302C, Charlie prompts the system to determine the separate externally provided status identifiers 202C-1 and 202C-2. There are also situations in which a user may desire to have separate external statuses provided to other users, e.g., via external personal status identifiers regardless of any group associations for either the user or the other users.

Returning to the example illustrated in FIG. 3, the user/group status determination module 306 can set a first group status identifier 304A for the Work Project group 104A and a second group status identifier 304B for the Noon Basketball group 104B. In determining each of the group status identifiers 304A and 304B, the user/group status determination module 306 can determine whether any applicable policies 308 are available and, if so, retrieve and apply the applicable policies 308 as part of the determination(s).

Embodiments of the disclosed technology can include setting a group status based on certain inference rules using the current status or presence values of each of the individual members of the group. Consider an example in which a majority of the members of the Work Project group 104A, e.g., Amy 102A and Bob 102B, have set their personal statuses 302A and 302B, respectively, to "out of the office." In the example, the user/group status determination module 306 can determine that, based on the personal status identifiers 302A-302C of the members of the group 102A-102C, the first group status identifier 304A should be set to "short-staffed today."

Figure 4:
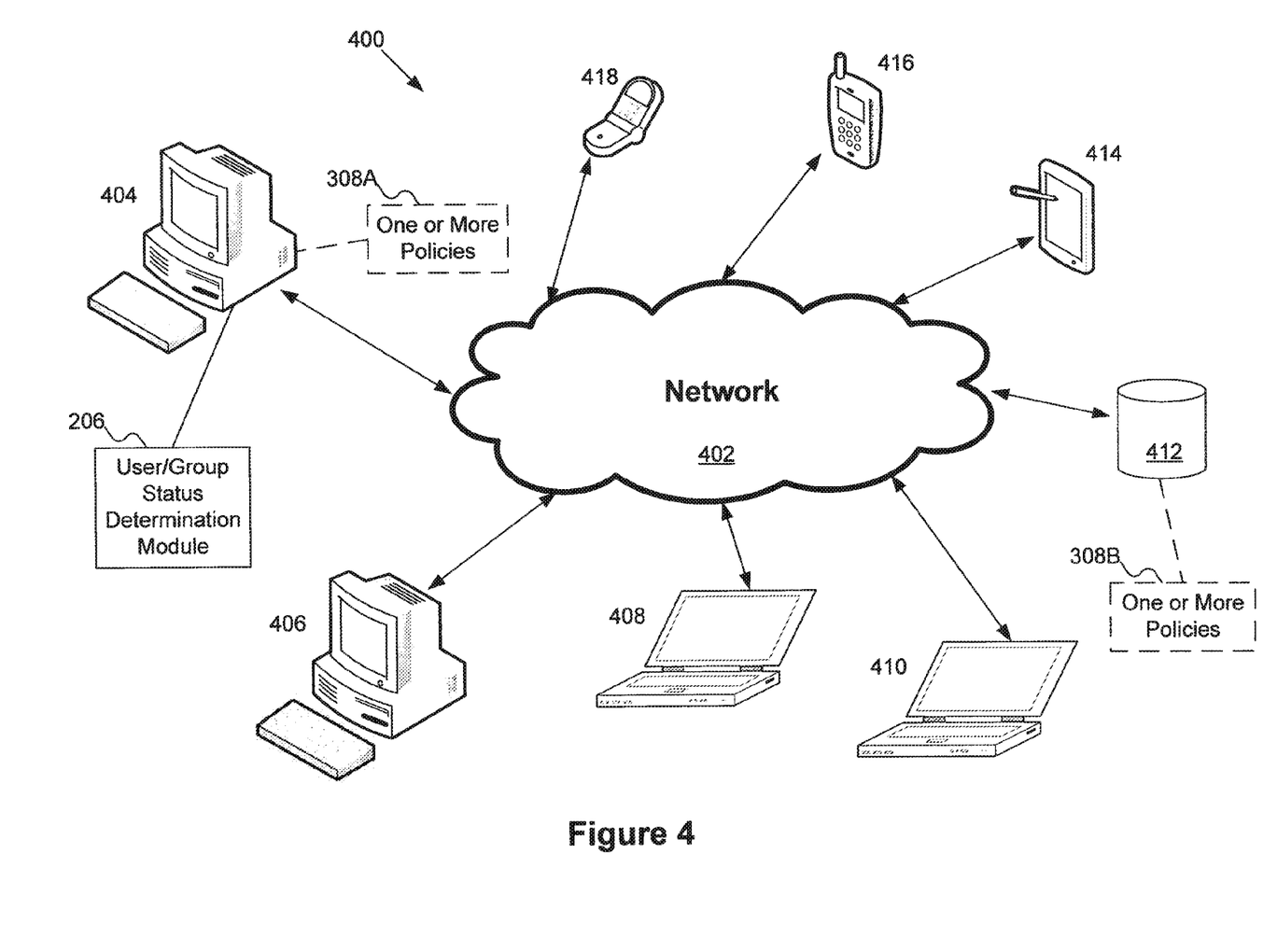
FIG. 4 illustrates an example of a system in which embodiments of the disclosed technology can be implemented.

FIG. 4 illustrates an example of a system 400 in which embodiments of the disclosed technology can be implemented. The system 400 includes a network 402, such as the Internet or a company's intranet, that facilitates interaction between multiple devices such as desktop computers 404 and 406 and laptop computers 408 and 410. Other devices such as a personal digital assistant (PDA) 414 and mobile devices 416 and 418, e.g., cellular or smart phones, can also be used as part of the system 400. In the example, Amy 102A may use the first desktop computer 404, Bob 102B may use the second desktop computer 406, and Charlie 102C may use the first laptop 408.

The system 400 also includes a database 412 that may be located locally or remotely. Because of the network 402, however, the database 412 can be made available to any of the computers 404-410 or other devices 414-418 regardless of geographic location. The one or more policies 308 discussed above can be stored locally at the user's desktop computer 404 or remotely at the database 412, for example.

It should be noted that, in certain embodiments, a user can set exceptions or overrides to certain policies 308. For example, consider a scenario in which Bob 102B sets his status to "just finished the project," which would normally trigger an update to the group status 304A for the Work Project group 104A to "Project Complete." Amy 102A can use a policy to set up a rule such that, in such situations, the system does not automatically update the group status 304A without a supervisor's approval to make sure that the group status is accurate by verifying that the project is truly complete, for example.

In certain embodiments, the one or more policies 308 can be identical at both locations. Alternatively, the user's desktop computer 404 may store certain policies 308A that are different than the policies 308B stored at the database 412. For example, the database 412 may store policies 308B concerning groups with which the user is not associated.

Figure 5:
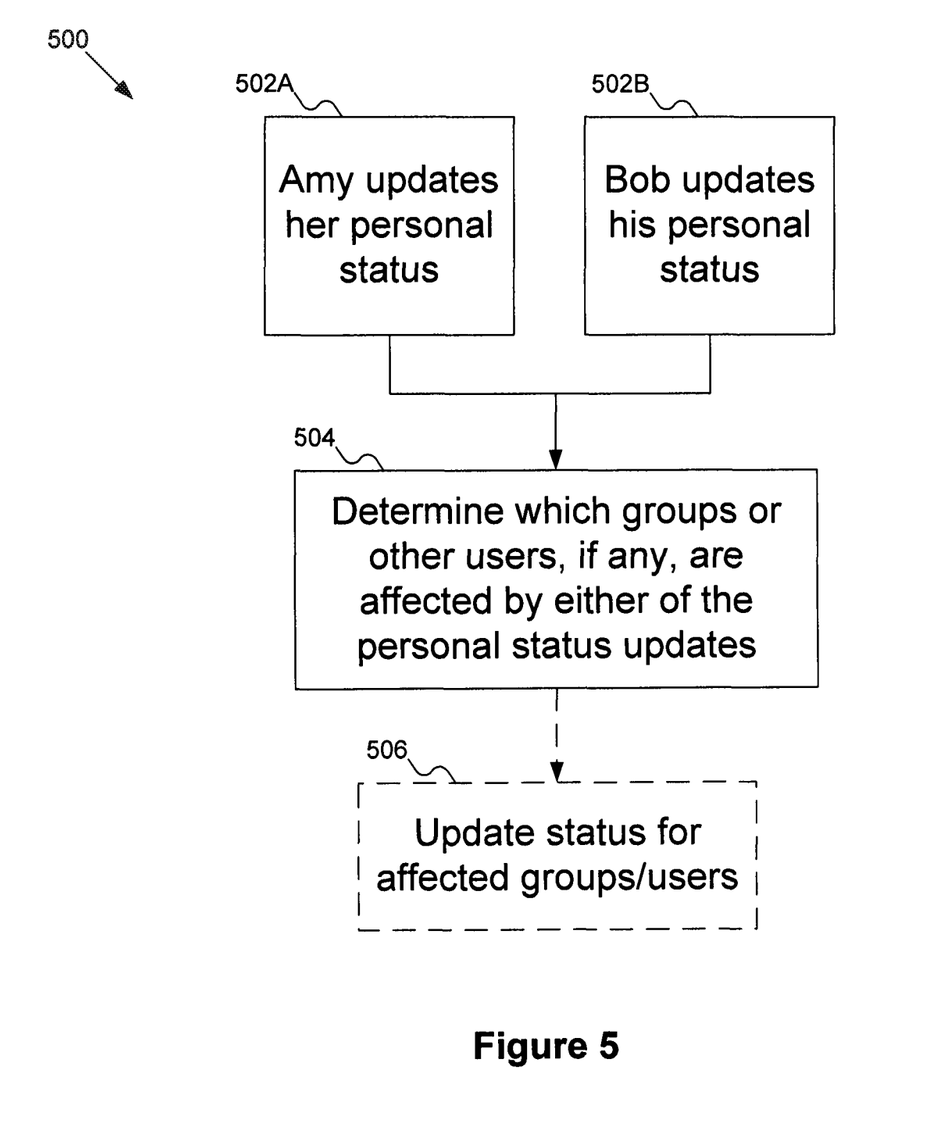
FIG. 5 is a flowchart that illustrates an example of a machine-controlled method of updating group and/or user statuses based on an update to the personal status of at least one user in accordance with embodiments of the disclosed technology.

FIG. 5 is a flowchart that illustrates an example of a machine-controlled method 500 of updating group and/or user statuses based on an update to the personal status of at least one user. In the example, users Amy 102A and Bob 102B each update their personal status 302A and 302B, respectively, as shown at 502A and 502B, respectively. For example, if Amy 102A is returning to work after an extended absence, Amy 102A can change her personal status identifier 302A from "out of the office" to "back at work."

Based on the updates to the personal statuses 302A and 302B of Amy 102A and Bob 102B, respectively, a determination can be made as to whether any groups or other individual users are affected, as shown at 504. In the example, i.e., Amy 102A changes her local status 302A from "out of the office" to "back at work," a determination can be made that some or all of the external personal status identifiers for Amy 102A provided to other users or groups should be updated to indicate Amy's return to work. The personal status identifiers provided to such groups and users can then be updated by the system, as shown at 506.

Figure 6:
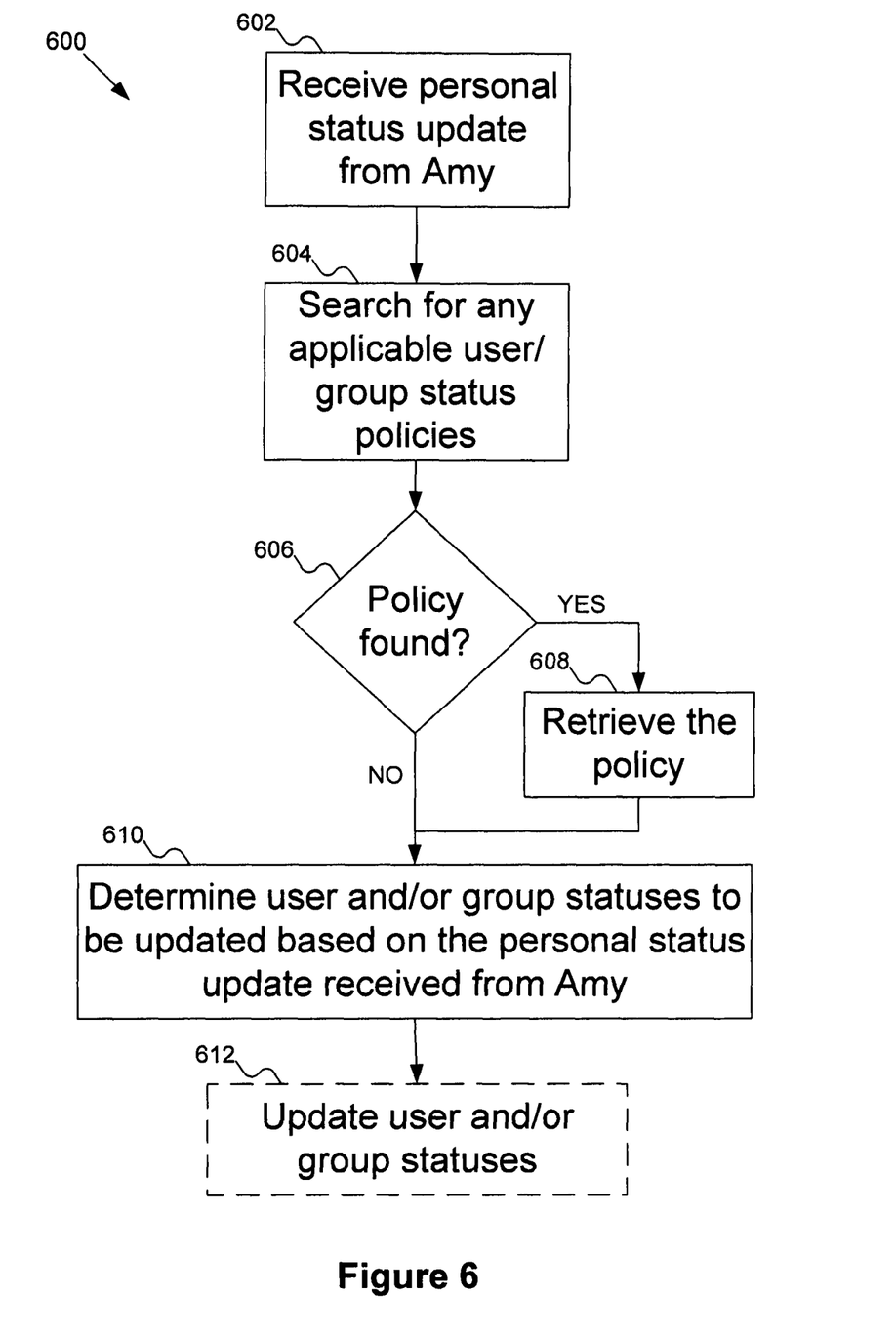
FIG. 6 is a flowchart that illustrates an example of a machine-controlled and policy-directed method of updating group and/or user statuses based on an update to the personal status of at least one user in accordance with embodiments of the disclosed technology.

FIG. 6 is a flowchart that illustrates an example of a machine-controlled and policy-directed method 600 of updating group and/or user statuses based on an update to the personal status of at least one user. At 602, the system receives a personal status update from user Amy 102A. For example, Amy 102A can update her personal status to "leaving right now for the airport" via her local personal status identifier 302A.

The system can begin by performing a search for any applicable policies 308, as shown at 604. The results of the search are presented at 606. If at least one applicable policy 308 is found, the system retrieves the policy 308, as shown at 608. If not, the system simply proceeds to 610. In certain embodiments, the system can issue some type of report indicating that no applicable policy 308 was found during the search.

At 610, the system determines whether any individual user statuses and/or group statuses should be updated based on the change to Amy's status at 602 as well as any policy 308 retrieved at 608. For example, if Bob 102B or Charlie 102C have already indicated via their local personal statuses 302B or 302C, respectively, that they are out of the office, then Amy's indication of leaving the office may mean that a majority of the members of the Work Project group 104A are out of the office. Thus, the system may determine that a group status 304A for the group 104A should be set to "short staffed." This determination can be made based on a policy 308 that is either general, specific to Amy 102A, or specific to the Work Project group 104A.

In situations where the system has determined that the statuses for one or more users or groups should be updated, the system can then update such external status identifiers, as shown at 612. Such affected users or groups are thus alerted to information pertaining to Amy's updated status, e.g., an indication that there are now a majority of Work Project 104A group members out of the office.

Certain implementations of the disclosed technology can include policy-directed access controls that can either display or suppress a user's personal status to other users. For example, a user may not wish to have his or her personal status displayed to other users that do not belong to the same group. Thus, the system can allow for the status of a certain individual or group to be either visible or not visible to other members in the group or in other groups based on a policy set by the individuals or by the group, for example. Alternatively, a system administrator can establish an override hierarchy via a policy, for example.

In certain embodiments, a group can be used to enable certain events based on a group status for the group. For example, if a certain number of members of the group, e.g., a majority of members, all read and updated a particular document called "Document X," the system can update the group status to "Document X updated." If the group reads a certain number of documents, e.g., relative to other groups in the collaborative environment, the system can update the group status to "This group is one of the top-ten most read groups."

Certain implementations of the disclosed technology can include using a collaboration application to establish certain groups rather than relying solely on groups that are set up by individual users using their own chat client. For example, in certain chat service implementations, the server side of the chat service can be configured to create server side groups that are independent of the groups at any or all of the individual chat service clients. In such embodiments, the system can set different group statuses depending on which side of the chat service the group resides. For example, the system can set a first group status for the server-side group and a second group status for the client-side group.

General Description of a Suitable Machine in which Embodiments of the Disclosed Technology can be Implemented The following discussion is intended to provide a brief, general description of a suitable machine in which embodiments of the disclosed technology can be implemented. As used herein, the term "machine" is intended to broadly encompass a single machine or a system of communicatively coupled machines or devices operating together. Exemplary machines can include computing devices such as personal computers, workstations, servers, portable computers, hand-held devices, tablet devices, and the like.

Typically, a machine includes a system bus to which processors, memory (e.g., random access memory (RAM), read-only memory (ROM), and other state-preserving medium), storage devices, a video interface, and input/output interface ports can be attached. The machine can also include embedded controllers such as programmable or non-programmable logic devices or arrays, Application Specific Integrated Circuits, embedded computers, smart cards, and the like. The machine can be controlled, at least in part, by input from conventional input devices (e.g., keyboards and mice), as well as by directives received from another machine, interaction with a virtual reality (VR) environment, biometric feedback, or other input signal.

The machine can utilize one or more connections to one or more remote machines, such as through a network interface, modem, or other communicative coupling. Machines can be interconnected by way of a physical and/or logical network, such as an intranet, the Internet, local area networks, wide area networks, etc. One having ordinary skill in the art will appreciate that network communication can utilize various wired and/or wireless short range or long range carriers and protocols, including radio frequency (RF), satellite, microwave, Institute of Electrical and Electronics Engineers (IEEE) 545.11, Bluetooth, optical, infrared, cable, laser, etc.

Embodiments of the disclosed technology can be described by reference to or in conjunction with associated data including functions, procedures, data structures, application programs, instructions, etc. that, when accessed by a machine, can result in the machine performing tasks or defining abstract data types or low-level hardware contexts. Associated data can be stored in, for example, volatile and/or non-volatile memory (e.g., RAM and ROM) or in other storage devices and their associated storage media, which can include hard-drives, floppy-disks, optical storage, tapes, flash memory, memory sticks, digital video disks, biological storage, and other tangible, physical storage media.

Associated data can be delivered over transmission environments, including the physical and/or logical network, in the form of packets, serial data, parallel data, propagated signals, etc., and can be used in a compressed or encrypted format. Associated data can be used in a distributed environment, and stored locally and/or remotely for machine access.

Having described and illustrated the principles of the invention with reference to illustrated embodiments, it will be recognized that the illustrated embodiments may be modified in arrangement and detail without departing from such principles, and may be combined in any desired manner. And although the foregoing discussion has focused on particular embodiments, other configurations are contemplated. In particular, even though expressions such as "according to an embodiment of the invention" or the like are used herein, these phrases are meant to generally reference embodiment possibilities, and are not intended to limit the invention to particular embodiment configurations. As used herein, these terms may reference the same or different embodiments that are combinable into other embodiments.

Consequently, in view of the wide variety of permutations to the embodiments described herein, this detailed description and accompanying material is intended to be illustrative only, and should not be taken as limiting the scope of the invention. What is claimed as the invention, therefore, is all such modifications as may come within the scope and spirit of the following claims and equivalents thereto.

The invention claimed is:

1. A system, comprising:
   a machine connected to a network, the machine having a database storing a plurality of policies;
   a first individual status identifier corresponding to a first user using a first device connected to the network;
   a second individual status identifier corresponding to a second user using a second device connected to the network;
   a third individual status identifier corresponding to a third user using a third device connected to the network;
   a first group status identifier corresponding to a first group, wherein the first and second users are members of the first group;
   a second group status identifier corresponding to a second group, wherein the first and third users are members of the second group; and
   a user/group status identifier determination module on the machine operable to update the first group status identifier based at least in part on an update to the first individual status identifier and the second individual status identifier, wherein the update to the first group status identifier is subject to at least one override set by a user, wherein visibility of each of the first individual status identifier, the second individual status identifier, and the first group status identifier to members of the first group is based on at least a first one of the plurality of policies stored on the machine, wherein the user/group status identifier determination module is further operable to update the second group status identifier based at least in part on an update to the first individual status identifier and the third individual status identifier, wherein visibility of each of the first individual status identifier, the third individual status identifier, and the second group status identifier to members of the second group is based on at least a second one of the plurality of policies stored on the machine.

2. The system of claim 1, wherein the first group status identifier is determined based on an update to the first individual status identifier and an update to the second individual status identifier.

3. The system of claim 2, wherein the first group status identifier is set to the most recent of the update to the first individual status identifier and the update to the second individual status identifier.

4. The system of claim 1, wherein the first group status identifier is determined based on a certain number of individual status identifiers corresponding to members of the group.

5. The system of claim 4, wherein the first group status identifier is determined based on an individual status identifier corresponding to a majority of members of the group.

6. The system of claim 4, wherein the first group presence identifier is determined based on an individual status identifier corresponding to members of the group that outnumbers other individual status identifiers corresponding to other members of the group.

7. The system of claim 1, wherein the first individual status identifier is configured by the first user to be visible only to other members of the first group, the second group, or both.

8. The system of claim 1, further comprising a fourth individual status identifier corresponding to the first user, wherein the fourth individual status identifier is provided to a fourth user, wherein the fourth user is not a member of the first group or the second group.

9. A machine-controlled method, comprising:
   receiving an update to a first individual status identifier corresponding to a first user, wherein the first user is a member of a first group and a second group;
   retrieving at least one policy from a database;
   determining whether a displayed first group status identifier corresponding to the first group is to be updated based on the update to the first individual status identifier and also on a first one of the at least one retrieved policy;
   responsive to a determination that the displayed first group status identifier is to be updated and subject to at least one override set by a user, updating the displayed first group status identifier;
   determining whether a displayed second group status identifier corresponding to the second group is to be updated based on the update to the first individual status identifier and also on a second one of the at least one retrieved policy; and
   responsive to a determination that the displayed second group status identifier is to be updated and subject to at least one override set by a user, updating the displayed second group status identifier.

10. The machine-controlled method of claim 9, further comprising:
    receiving an update to a second individual status identifier corresponding to a second user, wherein the second user is a member of the first group; and
    determining whether the displayed first group status identifier is to be updated based on the update to the second individual status identifier.

11. The machine-controlled method of claim 10, wherein the updating comprising setting the displayed first group status identifier to a most recent of the first individual status identifier and the second individual status identifier.

12. The machine-controlled method of claim 9, wherein the updating comprising setting the displayed first group status identifier to a value corresponding to a majority of individual status identifiers corresponding to multiple users.

13. One or more tangible, machine-readable media storing machine-executable instructions that, when executed, perform the machine-controlled method of claim 9.

14. The system of claim 1, wherein the updated first group status identifier is different than the updated second group status identifier.

\* \* \* \* \*